(12) United States Patent
Brogårdh

(10) Patent No.: US 10,272,562 B2
(45) Date of Patent: Apr. 30, 2019

(54) PARALLEL KINEMATICS ROBOT WITH ROTATIONAL DEGREES OF FREEDOM

(71) Applicant: ABB Schweiz AG, Baden (CH)

(72) Inventor: Torgny Brogårdh, Västerås (SE)

(73) Assignee: ABB Schweiz AG, Baden (CH)

( * ) Notice: Subject to any disclaimer, the term of this patent is extended or adjusted under 35 U.S.C. 154(b) by 271 days.

(21) Appl. No.: 15/308,050

(22) PCT Filed: Jun. 9, 2014

(86) PCT No.: PCT/EP2014/061934
§ 371 (c)(1),
(2) Date: Oct. 31, 2016

(87) PCT Pub. No.: WO2015/188843
PCT Pub. Date: Dec. 17, 2015

(65) Prior Publication Data
US 2017/0050312 A1 Feb. 23, 2017

(51) Int. Cl.
*B25J 17/00* (2006.01)
*B25J 17/02* (2006.01)
(Continued)

(52) U.S. Cl.
CPC .................................. *B25J 9/0072* (2013.01)

(58) Field of Classification Search
CPC .... B25J 17/0266; B25J 9/0051; B25J 9/0072; B25J 9/003; B25J 9/0045; B25J 9/0048
See application file for complete search history.

(56) References Cited

U.S. PATENT DOCUMENTS 7,188,544 B2   3/2007  Persson et al.
7,685,902 B2 * 3/2010  Kock ....................... B25J 9/107
                                                    414/735
(Continued)

FOREIGN PATENT DOCUMENTS

EP           1594661 A1    11/2005

OTHER PUBLICATIONS

International Search Report and Written Opinion of the International Searching Authority Application No. PCT/EP2014/061934 completed: Jan. 27, 2015; dated Feb. 5, 2015 9 pages.

*Primary Examiner* — Jake Cook
(74) *Attorney, Agent, or Firm* — Whitmyer IP Group LLC

(57) ABSTRACT

A parallel kinematics robot includes a base and an end effector movable in relation to the base. A first actuator is attached to the base and connected to the end effector via a first kinematic chain including a first drive arm, a first rod, a first joint between the first drive arm and the first rod, and a second joint between the first rod and the end effector. A second actuator is attached to the base and connected to the end effector via a second kinematic chain including a second drive arm, a second rod, a third joint between the second drive arm and the second rod, and a fourth joint between the second rod and the end effector. A third actuator is attached to the base or to the first drive arm, and connected to the end effector via a third kinematic chain including a first gear wheel and a second gear wheel, the first and second gear wheels being journalled in bearings to the end effector and intermeshing with each other. One element of the third kinematic chain constitutes a kinematic pair with at least one element of the first kinematic chain. A kinematic chain responsible for a translational movement of the end effector is utilized as a support structure for a kinematic chain responsible for a rotational movement of the end effector.

12 Claims, 3 Drawing Sheets

(51) Int. Cl.
  *B25J 18/00* (2006.01)
  *B25J 9/00* (2006.01)

(56) References Cited

U.S. PATENT DOCUMENTS

| | | | |
|---|---|---|---|
| 2004/0013509 A1* | 1/2004 | Roy | B23Q 1/5462 414/735 |
| 2004/0028516 A1 | 2/2004 | Brogardh | |
| 2004/0211284 A1* | 10/2004 | Roy | B23Q 1/5456 74/490.01 |
| 2005/0262959 A1* | 12/2005 | Angeles | B23Q 1/52 74/490.01 |
| 2006/0245894 A1* | 11/2006 | Merz | B25J 9/104 414/680 |
| 2012/0060637 A1 | 3/2012 | Kinoshita et al. | |
| 2013/0142608 A1 | 6/2013 | Zhang et al. | |
| 2013/0189063 A1* | 7/2013 | Brogardh | B25J 17/0266 414/589 |
| 2014/0060234 A1 | 3/2014 | Uemura | |

\* cited by examiner

PARALLEL KINEMATICS ROBOT WITH ROTATIONAL DEGREES OF FREEDOM

TECHNICAL FIELD

The present invention relates to a parallel kinematics robot wherein rotational degrees of freedom are transmitted from a base to an end effector.

BACKGROUND

Conventional parallel kinematics robots comprise a plurality of drive arms each connected, directly or via a gearbox, to a respective shaft of a servo motor at one end. At the opposite end each drive arm is connected to one or more rods, and the rods are further connected to an end effector. Between the drive arms and the rods, and between the rods and the end effector, respectively, there are joints with one to three degrees of freedom. The drive arms together with the rods and the joints form kinematic chains from the servo motors to the end effector for transmitting the rotating movement of the servo motors to a respective movement of an end effector. The servo motors and the respective drive arms work in parallel in the sense that a manipulation of one drive arm does not affect the position of the remaining drive arms.

Each kinematic chain of a parallel kinematics robot provides the respective end effector with a degree of freedom. A delta robot is one well known type of parallel kinematics robot that typically comprises three drive arms and has three translational degrees of freedom. Each drive arm is connected to an end effector via two rods having a ball joint at each end. The drive arms rotate about respective servo motor axes, the servo motors being arranged symmetrically such that their axes intersect at 60 degrees angles. U.S. Pat. No. 7,188,544 discloses one type of a delta robot comprising three drive arms. Delta robots can also comprise four or more drive arms.

In many applications it is desirable to provide the end effector also with rotational degrees of freedom such that the end effector can change its orientation. US2014/0060234A1 discloses a parallel kinematics robot where the end effector has one rotational degree of freedom, and US2012/0060637A1 discloses a parallel kinematics robot where the end effector has three rotational degrees of freedom. In US2014/0060234A1 an additional actuator (which can be a servo motor) is arranged between two rods that are a part of a kinematic chain between a servo motor and the end effector. In US2012/0060637A1 three additional servo motors are arranged at a base of the robot such that they are immobile in relation to the three servo motors responsible for the translational movements of the end effector.

A drawback with the solution of US2014/0060234A1 is that the additional actuator adds to the weight of the kinematic chain it is attached to, and consequently the servo motor responsible for the movements of that kinematic chain needs to be dimensioned bigger or cannot move as fast as the case would be without the additional weight. A drawback with the solution of US2012/0060637A1 is that the work area of the robot is strongly limited by the largest allowed inclination of the transmission members transmitting the driving force from the additional servo motors to the end effector. Between the transmission members and the end effector there are namely cardan type universal joints that stop working properly as the bend angles of the joints become too large.

There is a desire to provide a parallel kinematics robot where the aforementioned drawbacks are mitigated.

SUMMARY

One object of the invention is to provide a parallel kinematics robot with an alternative way of transmitting rotational degrees of freedom from the base to the end effector.

The invention is based on the realization that kinematic chains responsible for translational movements of the end effector can be utilized as support structures for kinematic chains responsible for rotational movements of the end effector.

According to a first aspect of the invention, there is provided a parallel kinematics robot comprising a base, and an end effector movable in relation to the base. A first actuator is attached to the base and connected to the end effector via a first kinematic chain comprising a first drive arm, a first rod, a first joint between the first drive arm and the first rod, and a second joint between the first rod and the end effector. A second actuator is attached to the base and connected to the end effector via a second kinematic chain comprising a second drive arm, a second rod, a third joint between the second drive arm and the second rod, and a fourth joint between the second rod and the end effector. A third actuator is attached to the base or to the first drive arm, and connected to the end effector via a third kinematic chain comprising a first gear wheel and a second gear wheel, the first and second gear wheels being journalled in bearings to the end effector and intermeshing with each other. At least one element of the third kinematic chain constitutes a kinematic pair with at least one element of the first kinematic chain. The first kinematic chain can thereby be utilized as a support structure for the third kinematic chain such that the third kinematic chain does not limit the movements of the first kinematic chain, and consequently does not negatively affect the robot's work area.

According to one embodiment of the invention, the kinematic pair is a revolute pair. A revolute pair is simple to accomplish with means of a journalled shaft or a hinge.

According to one embodiment of the invention, the first gear wheel is turned with means of a lever. This solution enables the third kinematic chain to consist of simple elements such as levers, rods and joints.

According to one embodiment of the invention, the first gear wheel is turned with means of a cardan shaft. This solution enables the first gear wheel to be turned over an indefinite angle.

According to one embodiment of the invention, the first gear wheel is closer to the third actuator in the third kinematic chain than the second gear wheel, and the first gear wheel has a larger diameter than the second gear wheel. This solution causes a relatively small angular rotation of the first gear wheel to result in a relatively large angular rotation of the second gear wheel, which is advantageous especially when the first gear wheel is turned with means of a lever and an angle over which the first gear wheel can be turned is limited.

According to one embodiment of the invention, the third kinematic chain comprises a rotating shaft parallel with the first drive arm.

According to one embodiment of the invention, the third kinematic chain comprises a belt parallel with the first drive arm.

According to one embodiment of the invention, the robot further comprises a fourth actuator attached to the base or to the second drive arm, and connected to the end effector via a fourth kinematic chain comprising a ninth gear wheel and a tenth gear wheel, the ninth and tenth gear wheels being journalled in bearings to the end effector and intermeshing with each other. At least one element of the fourth kinematic chain constitutes a kinematic pair with at least one element of the second kinematic chain. The second kinematic chain can thereby be utilized as a support structure for the fourth kinematic chain such that the fourth kinematic chain does not limit the movements of the second kinematic chain, and consequently does not negatively affect the robot's work area.

According to one embodiment of the invention, at least one element of the third kinematic chain is identical with an element of the fourth kinematic chain. The total number of differing parts for accomplishing the third and fourth kinematic chains can be reduced when at least one element is identical in both kinematic chains. Preferably as many elements as possible are identical.

BRIEF DESCRIPTION OF THE DRAWINGS

The invention will be explained in greater detail with reference to the accompanying drawings, wherein.

DETAILED DESCRIPTION

Figure 1:
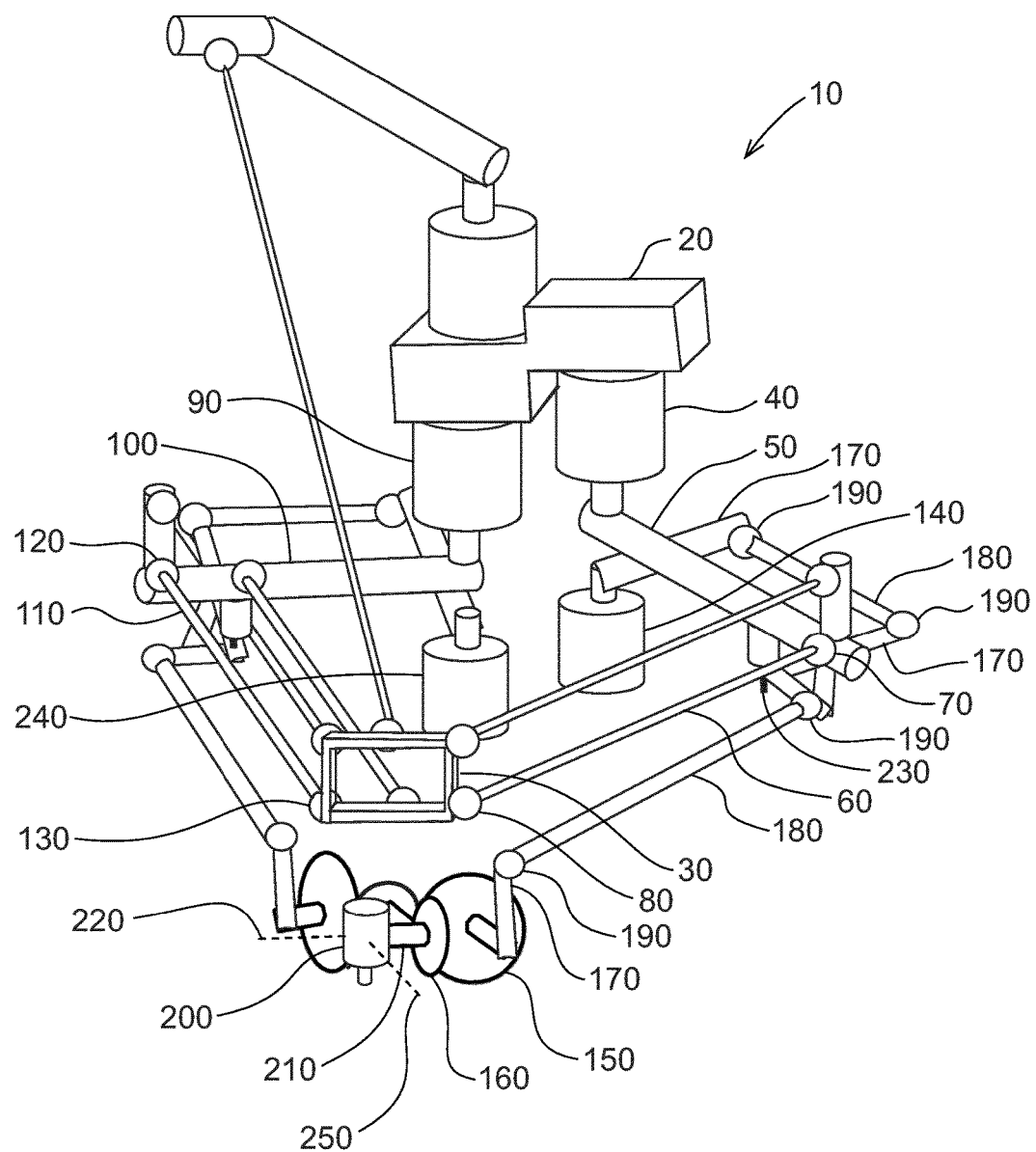
FIG. 1 shows one embodiment of the invention.

Referring to FIG. 1, a parallel kinematics robot 10 according to one embodiment of the invention comprises a base 20 and an end effector 30 movable in relation to the base 20. A first actuator 40 in the form of a servo motor is attached to the base 20 and connected to the end effector 30 via a first kinematic chain comprising a first drive arm 50, a first rod 60, a first joint 70 between the first drive arm 50 and the first rod 60, and a second joint 80 between the first rod 60 and the end effector 30. A second actuator 90 is attached to the base 20 and connected to the end effector 30 via a second kinematic chain comprising a second drive arm 100, a second rod 110, a third joint 120 between the second drive arm 100 and the second rod 110, and a fourth joint 130 between the second rod 110 and the end effector 30.

A third actuator 140 is attached to the base 20 or to the first drive arm 50 although for the sake of clarity of the figure the third actuator 140 is illustrated to be separate from the base 20 and the first drive arm 50. The third actuator 140 is connected to the end effector 30 via a third kinematic chain comprising a first gear wheel 150 and a second gear wheel 160. The third kinematic chain further comprises three levers 170, two bars 180 and four nodes 190 (joints with one to three degrees of freedom) for transforming a rotational movement of the third actuator 140 into a rotational movement of the intermeshing first and second gear wheels 150, 160. The first gear wheel 150 is closer to the third actuator 140 in the third kinematic chain than the second gear wheel 160, and the first and second gear wheels 150, 160 are journalled in bearings to the end effector 30 although for the sake of clarity of the figure the first and second gear wheels 150, 160 are illustrated to be separate from the end effector 30. A tool 200 is attached to a first shaft 210 rotating along with the second gear wheel 160, and an actuation of the third actuator 140 thereby causes the tool 200 to rotate about a first rotational axis 220 at the end effector 30. The first gear wheel 150 has a larger diameter than the second gear wheel 160 such that a relatively small angular rotation of the first gear wheel 150 causes a relatively large angular rotation of the second gear wheel 160.

One of the levers 170 is hinged by means of a hinge 230 to the first drive arm 50 and thereby constitutes a revolute pair with the same. The first drive arm 50 of the first kinematic chain is thereby utilized as a support structure for one of the levers 170 of the third kinematic chain. As the third kinematic chain is in this way integrated to the first kinematic chain, it does not limit the movements of the first kinematic chain, and consequently does not negatively affect the robot's 10 work area. The third kinematic chain does also not add much inertia to the first kinematic chain because all its elements are relatively light, and because the relatively heavy third actuator 140 is either attached to the base 20 or to the first drive arm 50. If the third actuator 140 is to be attached to the first drive arm 50, it is preferably attached close to the axis about which the first drive arm 50 rotates in order to minimize an increase in the inertia of the first kinematic chain.

A fourth actuator 240 is attached to the base 20 or to the second drive arm 100, and is further connected to the end effector 30 via a fourth kinematic chain corresponding to the third kinematic chain described hereinbefore. Also here, if the fourth actuator 240 is to be attached to the second drive arm 100, it is preferably attached close to the axis about which the second drive arm 100 rotates in order to minimize an increase in the inertia of the first kinematic chain. An actuation of the fourth actuator 240 causes the tool 200 to rotate about a second rotational axis 250 at the end effector 30, the second rotational axis 250 being perpendicular to the first rotational axis 220.

Figure 2:
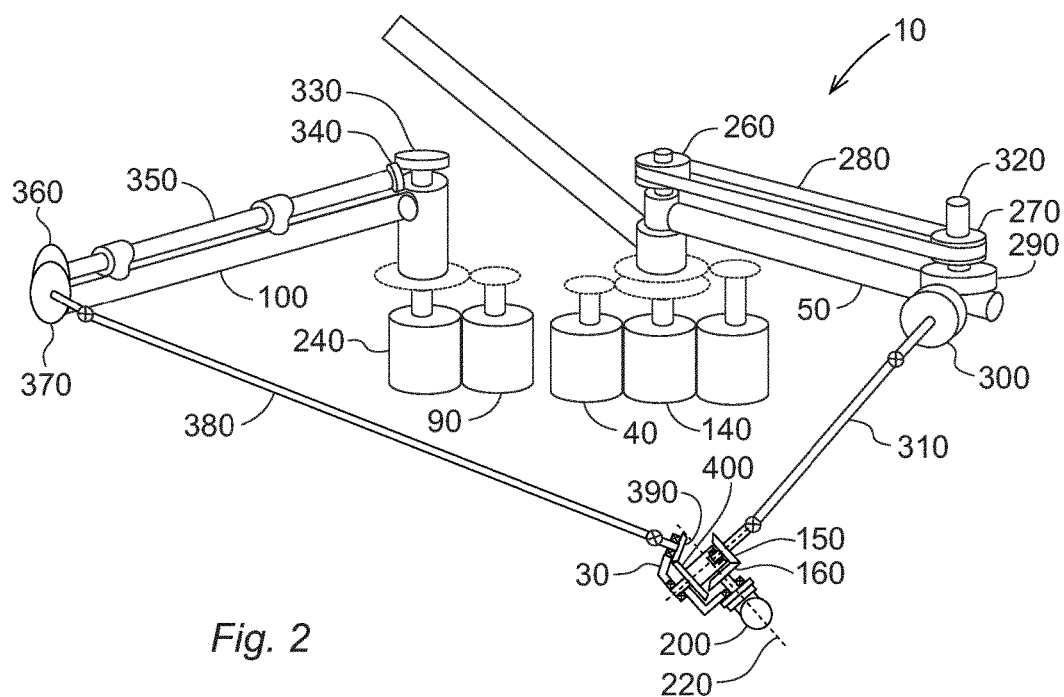
FIG. 2 shows one embodiment of the invention.

Referring to FIG. 2, a parallel kinematics robot 10 according to one embodiment of the invention is shown. The first actuator 40, the first drive arm 50, the second actuator 90 and the second drive arm 100 correspond to the equivalent elements of FIG. 1. The remaining elements of the first and second kinematic chains are omitted from FIG. 2 since they are not relevant for the illustrated third and fourth kinematic chains. The third actuator 140 is attached to the base 20 (not shown), and is further connected to the end effector 30 via a third kinematic chain comprising a first pulley 260, a belt 280 transmitting the rotation of the first pulley 260 to a second pulley 270, a third gear wheel 290, a fourth gear wheel 300 intermeshing with the third gear wheel 290, a first cardan shaft 310 transmitting the rotation of the fourth gear wheel 300 to the first gear wheel 150, and the second gear wheel 160 intermeshing with the first gear wheel 150. The second pulley 270 and the third gear wheel 290 are rotating along with a second shaft 320 journalled to the first drive arm 50, and they thereby constitute a revolute pair with the same. The first drive arm 50 of the first kinematic chain is thereby utilized as a support structure for the second pulley 270 and the third gear wheel 290 of the third kinematic chain.

The fourth actuator 240 is also attached to the base 20, and is further connected to the end effector 30 via a fourth kinematic chain comprising a fifth gear wheel 330, a sixth gear wheel 340, a third shaft 350 transmitting the rotation of the sixth gear wheel 340 to a seventh gear wheel 360, an eighth gear wheel 370 intermeshing with the seventh gear wheel 360, a second cardan shaft 380 transmitting the rotation of the eighth gear wheel 370 to a ninth gear wheel 390, and a tenth gear wheel 400 intermeshing with the ninth gear wheel 390. The third shaft 350 is journalled in relation to the second drive arm 100 to rotate parallel with the same, and the third shaft 350 thereby constitutes a revolute pair with the second drive arm 100. The second drive arm 100 of the second kinematic chain is thereby utilized as a support structure for the third shaft 350 of the fourth kinematic chain. It is to be understood that the third and fourth kinematic chains of FIG. 2 are alternative embodiments and consequently interchangeable. The elements of the third kinematic chain can thereby be used to form the fourth kinematic chain and vice versa.

Figure 3:
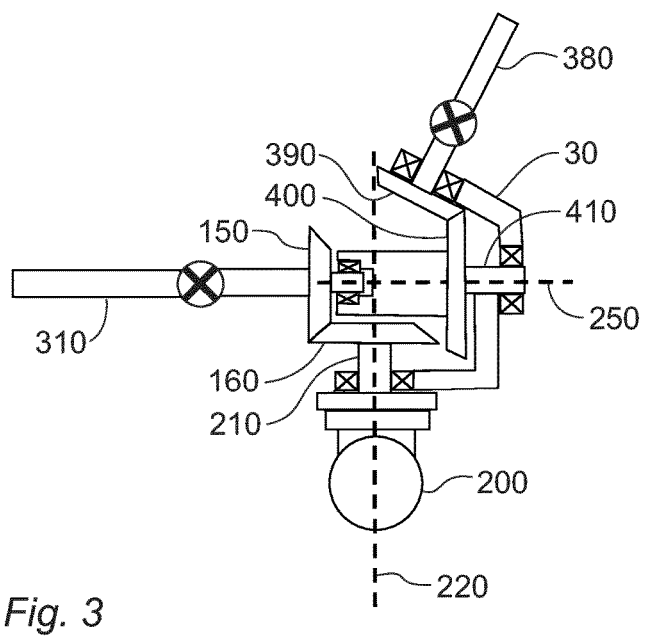
FIG. 3 shows the end effector of FIG. 2 in more detail from below.

Referring to FIG. 3, the end effector 30 of FIG. 2 is shown in more detail. The first, second, ninth and tenth gear wheels 150, 160, 390, 400 are journalled in bearings to the end effector 30. The tool 200 is attached to the first shaft 210 rotating along with the second gear wheel 160, and an actuation of the third actuator 140 thereby causes the tool 200 to rotate about the first rotational axis 220 at the end effector 30. The tool 200 is furthermore connected to a fourth shaft 410 rotating along with the tenth gear wheel 400, and an actuation of the fourth actuator 240 thereby causes the tool 200 to rotate about the second rotational axis 250 at the end effector 30, the second rotational axis 250 being perpendicular to the first rotational axis 220.

Figure 4:
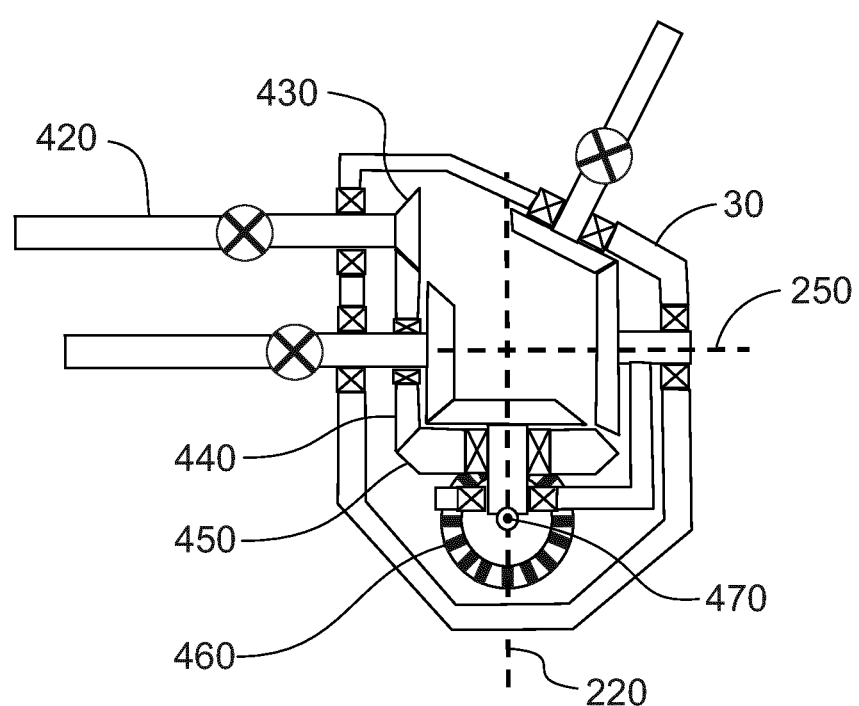
FIG. 4 shows an end effector with three rotational degrees of freedom.

Referring to FIG. 4, an end effector 30 with three rotational degrees of freedom is shown. In addition to the elements of FIG. 3 the end effector 30 of FIG. 4 comprises a third cardan shaft 420 configured to rotate an eleventh gear wheel 430, a twelfth gear wheel 440 intermeshing with the eleventh gear wheel 430, a thirteenth gear wheel 450 intermeshing with the twelfth gear wheel 440, and a fourteenth gear wheel 460 intermeshing with the thirteenth gear wheel 450. The aforementioned elements from the third cardan shaft 420 to the fourteenth gear wheel 460 are parts of a fifth kinematic chain actuated by a fifth actuator (not shown) attached to the base 20 (not shown). The tool 200 (not shown) is attached to the fourteenth gear wheel 460 and rotates along with it about a third rotational axis 470 when the fifth actuator is actuated. The third rotational axis 470 is perpendicular to the first and second rotational axes 220, 250, and thereby also perpendicular to the drawing plane of FIG. 4. The end effector 30 of FIG. 4 thereby has three rotational degrees of freedom about three perpendicular axes.

The invention is not limited to the embodiments shown above, but the person skilled in the art may modify them in a plurality of ways within the scope of the invention as defined by the claims.

The invention claimed is:

1. A parallel kinematics robot comprising:
   a base,
   an end effector movable in relation to the base,
   a first actuator attached to the base and connected to the end effector via a first kinematic chain comprising a first drive arm, a first rod, a first joint between the first drive arm and the first rod, and a second joint between the first rod and the end effector,
   a second actuator attached to the base and connected to the end effector via a second kinematic chain comprising a second drive arm, a second rod, a third joint between the second drive arm and the second rod, and a fourth joint between the second rod and the end effector,
   a third actuator attached to the base or to the first drive arm, and connected to the end effector via a third kinematic chain comprising a first gear wheel and a second gear wheel, the first and second gear wheels being journalled in bearings to the end effector and intermeshing with each other,
   wherein at least one element of the third kinematic chain constitutes a kinematic pair with at least one element of the first kinematic chain
   wherein the first gear wheel is turned with means of a lever.

2. The parallel kinematics robot according to claim 1, wherein the kinematic pair is a revolute pair.

3. The parallel kinematics robot according to claim 1, wherein the first gear wheel is closer to the third actuator in the third kinematic chain. than the second gear wheel, and the first gear wheel has a larger diameter than the second gear wheel.

4. The parallel kinematics robot according to claim 1, wherein the third kinematic chain comprises a rotating shaft parallel with the first drive arm.

5. The parallel kinematics robot according to claim 1, wherein the robot further comprises a fourth actuator attached to the base or to the second drive arm, and connected to the end effector via a fourth kinematic chain comprising a third gear wheel and a fourth gear wheel, the third and fourth gear wheels being journalled in bearings to the end effector and intermeshing with each other, and wherein at least one element of the fourth kinematic chain constitutes a kinematic pair with at least one element of the second kinematic chain.

6. The parallel kinematics robot according to claim 5, wherein both of the kinematic pairs are revolute pairs.

7. The parallel kinematics robot according to claim 5, wherein the third gear wheel is turned with means of a lever.

8. The parallel kinematics robot according to claim 5, wherein the third gear wheel is closer to the fourth actuator in the fourth kinematic chain than the fourth gear wheel, and the third gear wheel has a larger diameter than the fourth gear wheel.

9. The parallel kinematics robot according to claim 5, wherein the fourth kinematic chain comprises a rotating shaft parallel with the second drive arm.

10. The parallel kinematics robot according to claim 5, wherein at least one element of the third kinematic chain is identical with an element of the fourth kinematic chain.

11. The parallel kinematics robot according to claim 6, wherein the third gear wheel is turned with means of a lever.

12. The parallel kinematics robot according to claim 2, wherein the first gear wheel is closer to the third actuator in the third kinematic chain than the second gear wheel, and the first gear wheel has a larger diameter than the second gear wheel.

* * * * *